Nov. 26, 1940.   H. W. ST. JOHN ET AL   2,223,297
SIX-WHEEL LOCOMOTIVE TRUCK
Filed Feb. 18, 1939   4 Sheets-Sheet 1

INVENTOR
HENRY W. ST. JOHN
GRANT L. HUTCHISON
BY
ATTORNEY

Nov. 26, 1940.   H. W. ST. JOHN ET AL   2,223,297
SIX-WHEEL LOCOMOTIVE TRUCK
Filed Feb. 18, 1939   4 Sheets-Sheet 2
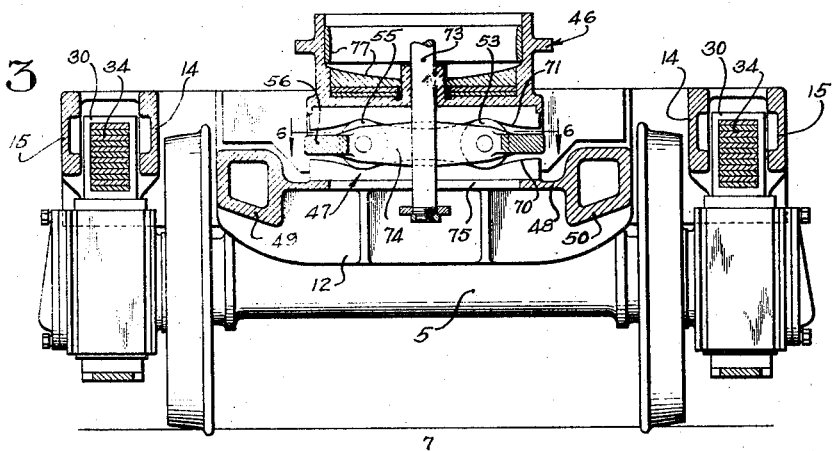
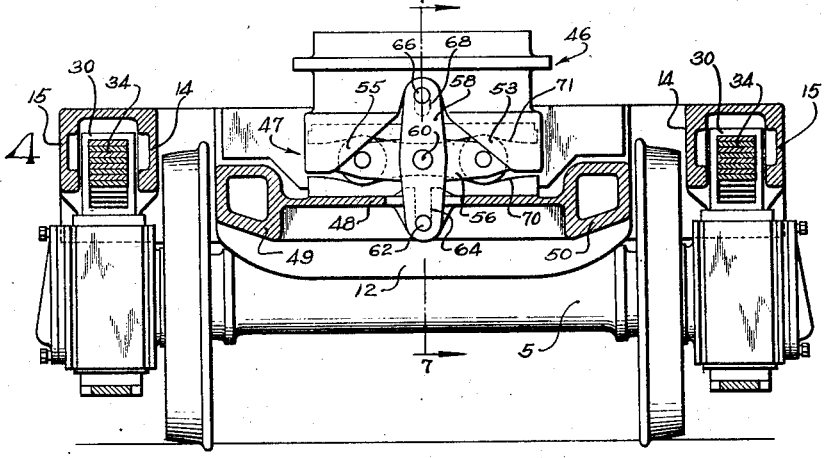
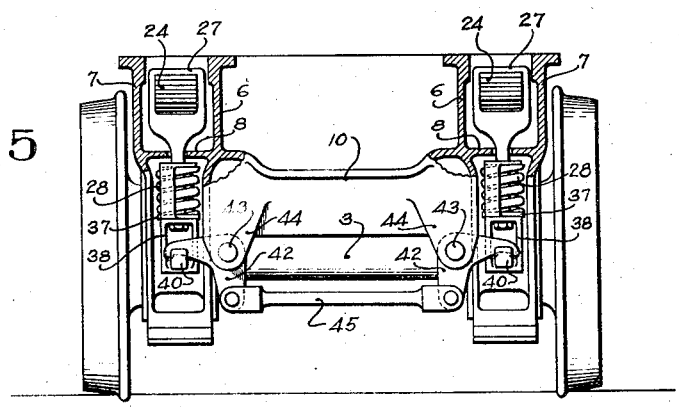
INVENTOR
HENRY W. ST. JOHN
GRANT L. HUTCHISON
BY
ATTORNEY Nov. 26, 1940.  H. W. ST. JOHN ET AL  2,223,297

SIX-WHEEL LOCOMOTIVE TRUCK

Filed Feb. 18, 1939  4 Sheets-Sheet 3

INVENTOR
HENRY W. ST. JOHN
GRANT L. HUTCHISON
BY
ATTORNEY

Nov. 26, 1940.  H. W. ST. JOHN ET AL  2,223,297

SIX-WHEEL LOCOMOTIVE TRUCK

Filed Feb. 18, 1939  4 Sheets-Sheet 4

INVENTOR
HENRY W. ST. JOHN
GRANT L. HUTCHISON
BY
ATTORNEY

Patented Nov. 26, 1940

2,223,297

UNITED STATES PATENT OFFICE 2,223,297

SIX-WHEEL LOCOMOTIVE TRUCK

Henry W. St. John, Llanerch, and Grant L. Hutchison, Collingdale, Pa.

Application February 18, 1939, Serial No. 257,212

7 Claims. (Cl. 105—188)

This invention relates generally to locomotives and more particularly to an improved leading truck especially of the six-wheel type.

The demand for more powerful and faster steam locomotives has necessitated making the same heavier and longer. While powerful locomotives have been built of the articulated type, yet these are usually adapted only for freight service whereas for passenger service, it is now proposed to use two pairs of cylinders supported upon a single rigid frame, thus causing the frame to be of considerable length. Such a locomotive in traveling around curves will have appreciably more lateral movement at its front end than is present in the customary size locomotive. Another factor entering into the increased length of more powerful locomotives is that the height and width of a locomotive are definitely limited by existing clearances for station platforms as well as for tunnels, bridges, etc. and as a result, it is necessary to make these larger locomotives highly compact in order to avoid a prohibitively long engine, but at the same time it is necessary to maintain a high degree of strength and flexibility but without sacrifice of stability in order that the heavier locomotive may travel at high speeds.

It is an object of our invention to provide an improved leading engine truck that is particularly adapted for use in a relatively long and high powered locomotive. A further object is to provide an improved leading engine truck whereby a bolster may have considerable lateral movement as well as permit the locomotive to have large diameter engine cylinders without undue restriction by or interference from the leading truck.

A further object is to provide an improved spring rigging system that is adapted to be compactly arranged with our improved truck whereby maximum flexibility may be had together with a high degree of stability. In this respect a further object is to provide an improved cross-equalizing system, preferably at both ends of the truck, and to have this cross-equalizing system suitably coordinated with longitudinal plate springs so as to insure proper dampening of the spring action.

Other objects and advantages will be more apparent to those skilled in the art from the following description of the accompanying drawings in which:

Fig. 3 is a transverse section taken on the line 3—3 of Fig. 1;

Fig. 4 is a transverse section taken on the line 4—4 of Fig. 1;

Fig. 5 is an end elevation of either end of Figs. 1 or 2, parts of which are broken away to show details of construction;

Figure 1:
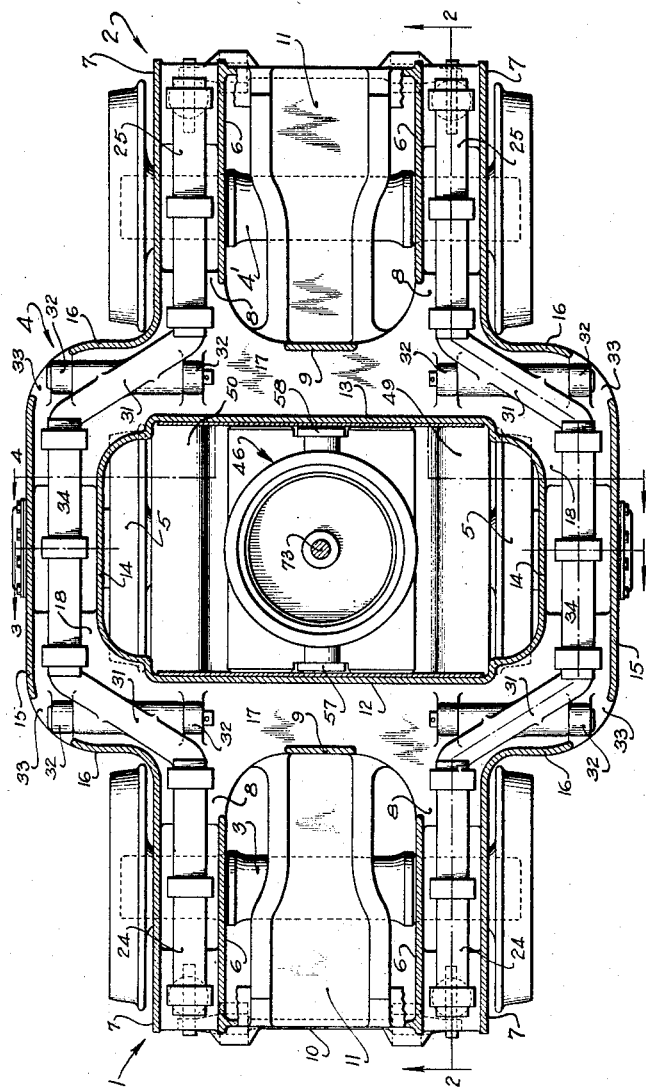
Fig. 1 is a sectional plan view taken on the line 1—1 of Fig. 2 but showing the center pin bearing in full rather than in section.

In the particular embodiment of the invention, such as is disclosed herein merely for the purpose of illustrating one specific form among possible others that the invention might take in practice, we have shown a six-wheel truck having essentially front and rear narrow frame sections generally indicated at 1 and 2 adapted for inboard bearings for wheeled axles 3 and 4' and an intermediate wide section generally indicated at 4 adapted for outboard bearings for a central wheeled axle 5. The front and rear sections are identical and each comprises short longitudinal frames having inner and outer side walls 6 and 7 connected by a transverse web 8. The ends of the sections 1 and 2 are connected by end sills 10 which, in turn are connected to a short outer transverse transom wall 9 by a suitable longitudinal structure generally indicated at 11. The walls 9 also form a transverse wall for the inner ends of the end sections 1 and 2.

The intermediate section 4 has a bolster opening formed by transverse walls 12 and 13 and by end walls 14 which form part of side wheel pieces having outer walls 15. The outer wall 15 is continued inwardly as at 16 to merge with the outer walls 7. The walls 9, 12, 14, 15 and 16 are connected to each other by horizontal webs 17 and 18 formed substantially as a continuation of the webs 8. From the foregoing, it is seen that the walls 9, 12 and 16 form one transom of the intermediate section and the walls 13, 9 and 16 form the other transom while each pair of walls 14 and 15 form side wheel pieces. Projecting downwardly from and integrally with the frame sections 1 and 2 are pedestals 20 in which inboard journal boxes 21 are slidably disposed for wheeled axles 3 and 4'. Pedestals 22, projecting downwardly from and integrally with the side wheel pieces of intermediate section 4, have outboard journal boxes 23 for wheeled axle 5.

The truck frame as above described is supported upon the journal boxes 21, 23 and 21 through a spring rigging system extending along and following each side of the front, intermediate and rear sections 1, 4 and 2. Each spring rigging comprises a pair of plate springs 24 and 25 seated upon the journal boxes 21, 21 of axles 3 and 4' while an intermediate plate spring 34 is supported on journal box 23. The outer ends of springs 24 and 25 are connected through spring hangers 27 and 27', Fig. 2, to coil springs 28 and 29 disposed beneath webs 8. The inner end of spring 24 and the adjacent end of spring 34 are each provided with spring hangers 30, Fig. 2, which in turn, are connected to a diagonal rocking equalizer 31. This equalizer is pivotally supported on a transverse axis in suitable bosses 32 projecting upwardly from and formed integrally with the horizontal web portion 17. Identical rocking equalizers and spring hangers are located at each of the four corners of the intermediate section 4 and hence need not be described. The outer walls 15 of the side wheel pieces have corner openings 33 through which the fulcrum pins of the equalizers 31 may be removed or inserted while the spaces between walls 6 and 9 provide an opening through which rocking equalizers 31 may be removed.

Figure 2:
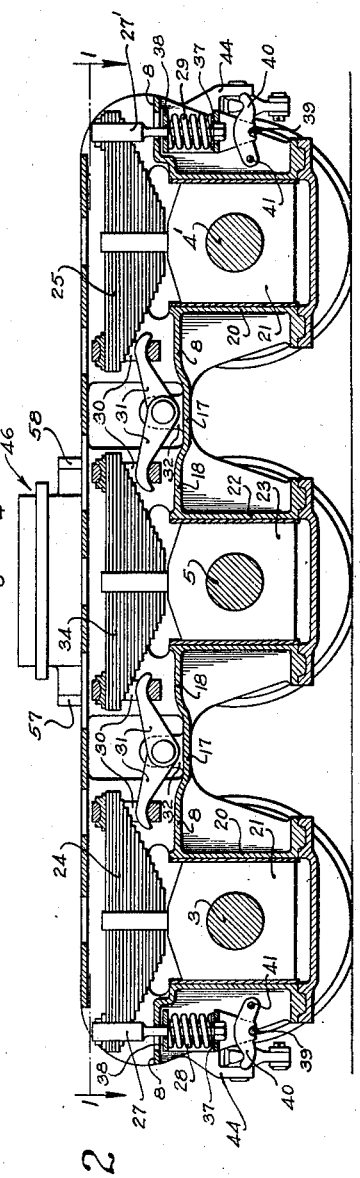
Fig. 2 is a longitudinal section taken substantially on the line 2—2 of Fig. 1 through the spring rigging system but showing various parts thereof in side elevation.

The outer ends of springs 24 and 25 are connected through spring hangers 27 and 27', Fig. 2, to coil springs 28 and 29 disposed beneath the frame webs 8. Inasmuch as the arrangement for the coil springs 28 and 29 is identical, it will suffice to describe only one in connection with the cross-equalization of the two spring systems which extend along each side of the truck. Coil spring 28 is supported by a washer 37 on the lower end of hanger 27 while the upper end of spring 28 bears against the closed end 38 of a suitable inverted U-shaped hanger 26 whose lower end has a fulcrum cross member 39. An equalizing lever 40, supported on fulcrum 39, is pivoted as at 41 to the truck frame adjacent pedestal 20 while the outer end of said lever is pivotally connected (Fig. 5) to one arm of a bell crank 42. This bell crank is, in turn, pivotally supported at 43 to suitable bosses 44 projecting downwardly from end sill 10. The other arms of the bell crank 42 are cross-connected by a link 45. The bell cranks and link 45 are, as shown in Fig. 5, located entirely within the lateral limits of the narrowed frame sections 1 and 2.

Figure 9:
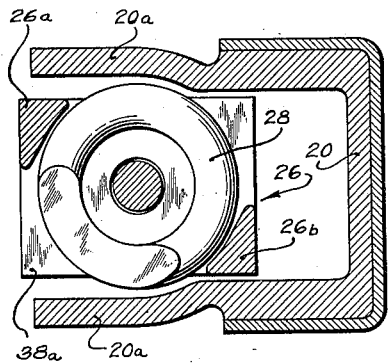
Fig. 9 is a horizontal section taken on the line 9—9 of Fig. 8.
Figure 10:
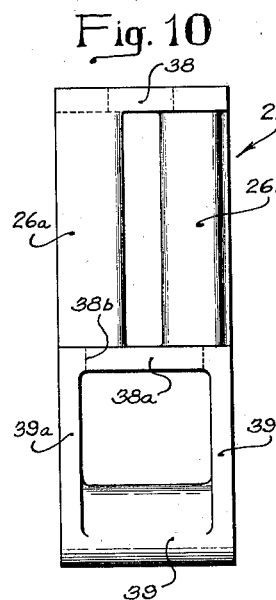
Fig. 10 is an enlarged end elevation of the coil spring hanger with the spring and other parts omitted for the sake of clarity.
Figure 8:
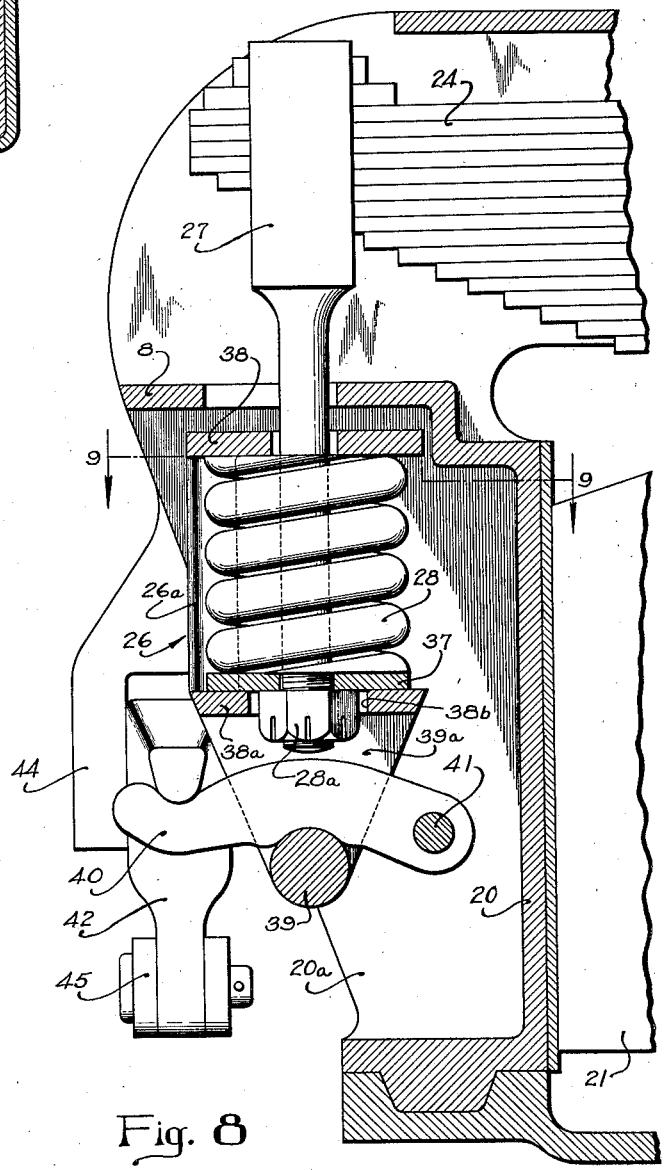
Fig. 8 is a fragmentary vertical section through the coil spring and its hanger for the cross-equalizing mechanism.

As shown in Figs. 8 to 10 the coil spring hanger 26 is arranged to permit the spring to have a maximum diameter within a limited space while still allowing the hanger to have maximum strength. This is accomplished as shown in Fig. 9 by having the diagonally located side pieces 26a and 26b connect the upper closed end 38 to a lower reinforcing web 38a. This web provides a support from which two side members 39a and 39b project downwardly thereby to support the fulcrum cross member 39. The web 38a has an enlarged opening 38b for receiving a nut 29a which supports the coil spring through washer 37. Hence the nut and washer may move upwardly into the inverted U-shaped hanger 26 during compression of coil spring 28. As shown in Fig. 9, the diagonally located vertical side pieces 26a and 26b permit the coil spring 28 to extend laterally beyond the sides of the hanger 26 so as to come very close to the reinforcing walls 20a of the outer pedestals. Also, the diagonal arrangement of the side members 26a and 26b allows ample space through which the enlarged coil springs may be removed in a diagonal direction from the hanger when the latter is removed from the spring rigging system.

As is clearly shown in Fig. 1, plate springs 24 and 25 are disposed between the walls 6 and 7 of the front and rear narrow sections 1 and 2 while plate springs 34 are between the walls 14 and 15 of the side wheel pieces of the intermediate section 4. This enclosed arrangement is accomplished through the interposition of the diagonally extending rocking equalizers 31 housed within what constitutes the transoms of the intermediate section 4. This insures maximum compactness, while at the same time maintaining full flexibility of the spring rigging system.

Figure 6:
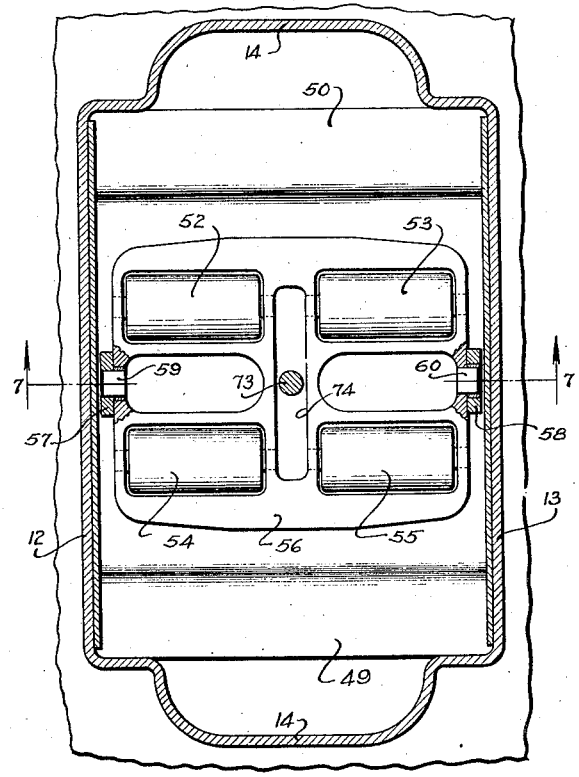
Fig. 6 is a horizontal section taken substantially on the line 6—6 of Figs. 7 and 3.

Supported within the intermediate section 4 is a combined swing bolster and center pin bearing 46 beneath which is a centering device 47 supported as shown in Fig. 4 upon a horizontal web 48 connecting two longitudinal frame elements 49 and 50. The ends of these frame elements are formed integrally with the transom walls 12 and 13 of the intermediate section 4. The centering device, broadly, is of a well-known form and does not per se constitute a part of my present invention, except insofar as it is peculiarly modified to adapt it to my improved combination. To this end, it will be noted that two pairs of longitudinally aligned rollers 52, 53 and 54, 55, Fig. 6, are journalled in a suitable frame 56, Fig. 6. The ends of this frame have arms 57 and 58 pivotally connected thereto as at 59 and 60 while the lower ends of said arms, Figs. 4 and 7, have secured thereto a pair of pins 61 and 62 projecting inwardly into slots 63 and 64 which are suitably formed in lugs on web 48. The upper ends of said arms 57 and 58 have secured thereto similar pins 65 and 66 projecting inwardly into vertical slots 67 and 68 formed in the front and rear sides of bolster 46. The two pairs of rollers are supported between centering plates 70 and 71 which as is well-known in the art, have inclined surfaces whereby lateral movement of the bolster 46 relative to the truck frame will cause the bolster to move upwardly but it will be continually urged back to its center position by said inclined surfaces. During vertical movement of roller frame 56, the arms 57 and 58 will cause their lower pins 61 and 62 to move upwardly within slots 63 and 64 while the upper pins 65 and 66 will move downwardly relative to their slots 67 and 68. Hence the respective pins are normally located in the remote ends of said slots when the bolster is in its normal central position. These arms insure uniform lateral movement of both ends of the frame 56 and force the rollers to move over the inclined surfaces whenever the bolster has any lateral movement thereby avoiding excessive wear. Also, the frame and rollers return to their central position when normal conditions prevail.

Figure 7:
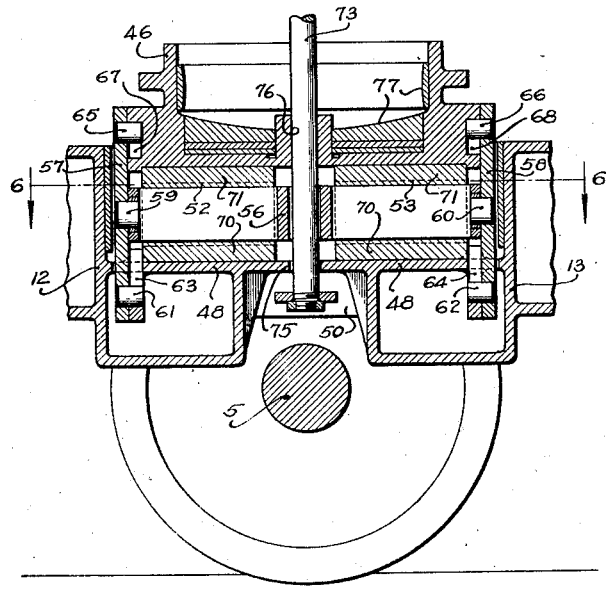
Fig. 7 is a longitudinal section taken substantially on the line 7—7 of Figs. 6 and 4.

A center pin bolt 73 extends through a transversely elongated slot 74 in the roller frame 56, Fig. 6, and through a similar vertically aligned transverse slot 75, Fig. 7, in the truck frame. The center pin bolt has a close fit with an opening 76 in the swing bolster. Suitable bearing plates and surfaces 77 are also formed in the bolster to support and guide a center pin plate.

It will of course be understood that various changes in details of construction and arrangement of parts may be made by those skilled in the art without departing from the spirit of the invention as set forth in the appended claims.

We claim:

1. A six-wheel locomotive truck comprising, in combination, a truck frame having longitudinally extending front and rear narrow sections provided with inboard bearings for wheeled axles and a wide center section having side wheel pieces provided with outboard bearings for an intermediate wheeled axle, spaced transoms connecting said side wheel sections, said longitudinal narrow sections terminating at said transoms thereby to provide a clear transverse space between the wheels of said center section, a lateral motion bolster disposed between said transoms within said clear space and movable for substantially the full width of said narrow sections, a spring rigging system for said wheels including longitudinal plate springs supported on said inboard and outboard bearings whereby the springs supported on the inboard bearings are offset inwardly from the springs supported on the outboard bearings, and rocking equalizers supported by said truck frame and extending from the inwardly offset springs to the springs supported on the outboard bearing.

2. A six-wheel locomotive truck comprising, in combination, a truck frame having longitudinally extending front and rear narrow sections provided with inboard bearings for wheeled axles and a wide center section having side wheel pieces provided with outboard bearings for an intermediate wheeled axle, spaced transoms connecting said side wheel pieces and said longitudinal narrow sections terminating at said transoms thereby to provide a clear transverse space between the wheels of the center section, a spring rigging system for said wheels including longitudinal plate springs supported on said inboard and outboard bearings and diagonal rocking equalizers supported by said transoms and extending from the springs adjacent the inboard bearings to the spring adjacent the outboard bearings, and a lateral motion bolster disposed between and guided by said transoms and adapted to have lateral movement for a distance substantially equal to the full width of said narrow sections.

3. A six-wheel locomotive truck comprising, in combination, a truck frame having longitudinally extending front and rear narrow sections provided with inboard bearings for wheeled axles and a wide center section having side wheel pieces provided with outboard bearings for an intermediate wheeled axle, said center section of the truck frame having side wheel pieces and transoms all formed of spaced walls and the narrow sections of the truck frame also having longitudinal frame members formed of spaced walls, longitudinal plate springs disposed between the spaced walls of each section, and rocking equalizers located adjacent said transoms and extending diagonally to connect the springs which are positioned at the wide and narrow truck sections.

4. A six-wheel locomotive truck comprising, in combination, a frame having longitudinally extending front and rear narrow sections provided with inboard bearings for wheeled axles and a center section having spaced transoms and side wheel pieces provided with outboard bearings for an intermediate wheeled axle, said narrow frame sections and said side wheel pieces all having inner and outer spaced walls, the outer walls of said narrow frame sections turning outwardly toward the outer walls of the side wheel pieces, said transoms having inner and outer longitudinally spaced walls, the outer transom walls forming transverse walls of the narrow frame sections and the inner transom walls merging with the inner walls of the side wheel pieces whereby a continuous clear space is provided which first extends longitudinally from one end of the truck frame and then turns outwardly adjacent one transom and thence extends along the wheel pieces and turns inwardly adjacent the other transom and thence longitudinally to the other end of the truck, and a spring rigging system including springs and rocker equalizers disposed in said clear spaces.

5. A six-wheel locomotive truck comprising, in combination, a truck frame having longitudinally extending front and rear narrow sections provided with inboard bearings for wheeled axles and a wide center section having side wheel pieces provided with outboard bearings for an intermediate wheeled axle, said center section of the truck frame having side wheel pieces each provided with spaced walls and the narrow sections of the truck frame also having longitudinal frame members each formed of spaced walls, transoms connecting said side wheel pieces and said longitudinal frame members terminating at said transoms thereby providing a clear transverse space between the wheels of the intermediate section, a lateral motion bolster disposed between and guided by said transoms, longitudinal plate springs supported between the spaced walls of each section, rocking equalizers located adjacent said transoms and extending diagonally to connect the springs which are positioned at the wide and narrow truck sections.

6. A six-wheel locomotive truck comprising, in combination, a frame having longitudinally extending front and rear narrow sections provided with inboard bearings for wheeled axles, a center frame section having spaced transoms and side wheel pieces provided with outboard bearings for an intermediate wheeled axle, said narrow frame sections and said side wheel pieces all having inner and outer spaced walls and said transoms having walls merging with the inner walls of the side wheel pieces whereby a continuous clear space is provided which first extends longitudinally from one end of the truck frame and then turns outwardly adjacent one transom and thence extends along the wheel pieces and turns inwardly adjacent the other transom and thence extends longitudinally to the other end of the truck, and a spring rigging system including springs and rocker equalizers disposed in said clear spaces.

7. A six-wheel locomotive truck comprising, in combination, a frame having longitudinally extending front and rear narrow sections, provided with inboard bearings for wheeled axles, a center frame section having spaced transoms and side wheel pieces provided with outboard bearings for an intermediate wheeled axle, said narrow frame sections and said side wheel pieces having horizontal webs and vertical side walls, the vertical walls of said narrow frame sections turning outwardly toward the vertical walls of said side wheel pieces, said transoms having webs connecting with said other webs and also having longitudinally spaced walls extending transversely between said side wheel pieces whereby a continuous clear space is provided which first extends longitudinally from one end of the truck frame and then turns outwardly adjacent one transom and thence extends along the wheel pieces and turns inwardly adjacent the other transom and thence longitudinally to the other end of the truck, and a spring rigging system including springs and rocker equalizers disposed in said clear spaces.

HENRY W. ST. JOHN.
GRANT L. HUTCHISON.